(12) United States Patent
Shanmugham et al.

(10) Patent No.: US 7,282,238 B2
(45) Date of Patent: Oct. 16, 2007

(54) METHOD OF DEPOSITING MATERIALS

(75) Inventors: Subramaniam Shanmugham, Duluth, GA (US); Andrew Tye Hunt, Atlanta, GA (US); Girish Deshpande, Atlanta, GA (US); Tzyy-Jiuan Jan Hwang, Alpharetta, GA (US); Erika Moore, Dunwoody, GA (US); Yongdong Jiang, Atlanta, GA (US)

(73) Assignee: nGimat Co., Atlanta, GA (US)

( * ) Notice: Subject to any disclaimer, the term of this patent is extended or adjusted under 35 U.S.C. 154(b) by 764 days.

(21) Appl. No.: 10/111,684

(22) PCT Filed: Jun. 27, 2001

(86) PCT No.: PCT/US01/20667

§ 371 (c)(1),
(2), (4) Date: Apr. 26, 2002

(87) PCT Pub. No.: WO02/02246

PCT Pub. Date: Jan. 10, 2002

(65) Prior Publication Data

US 2003/0047617 A1    Mar. 13, 2003

(51) Int. Cl.
*B05D 3/08* (2006.01)

(52) U.S. Cl. .............. 427/223; 427/224; 427/225; 427/375; 427/376.2; 427/383.1; 427/385.5

(58) Field of Classification Search .......... 427/223, 427/224, 225, 375, 376.2, 383.1, 385.5, 421
See application file for complete search history.

(56) References Cited

U.S. PATENT DOCUMENTS

| | | | | |
|---|---|---|---|---|
| 3,944,685 A | * | 3/1976 | Gunnerman | ............... 427/223 |
| 4,612,249 A | * | 9/1986 | Packer et al. | ............ 428/424.8 |
| 5,376,421 A | * | 12/1994 | Sekhar et al. | ............... 427/224 |

* cited by examiner

*Primary Examiner*—Bret Chen
(74) *Attorney, Agent, or Firm*—Wayne E. Nacker; Alfred H. Muratori

(57) ABSTRACT

A coherent material is formed on a substrate (10) by providing a precursor suspension (14) in which particulates are suspended in a carrier fluid, and directing the precursor suspension (14) at the substrate (10) from a first source (12). Generally contemporaneously with application of the deposited precursor suspension (14) to the surface, hot gases, e.g. hot gases produced by a flame (16), are directed at the substrate (10) from a remote second source (18) to fuse the particulates into the coherent material.

28 Claims, 1 Drawing Sheet

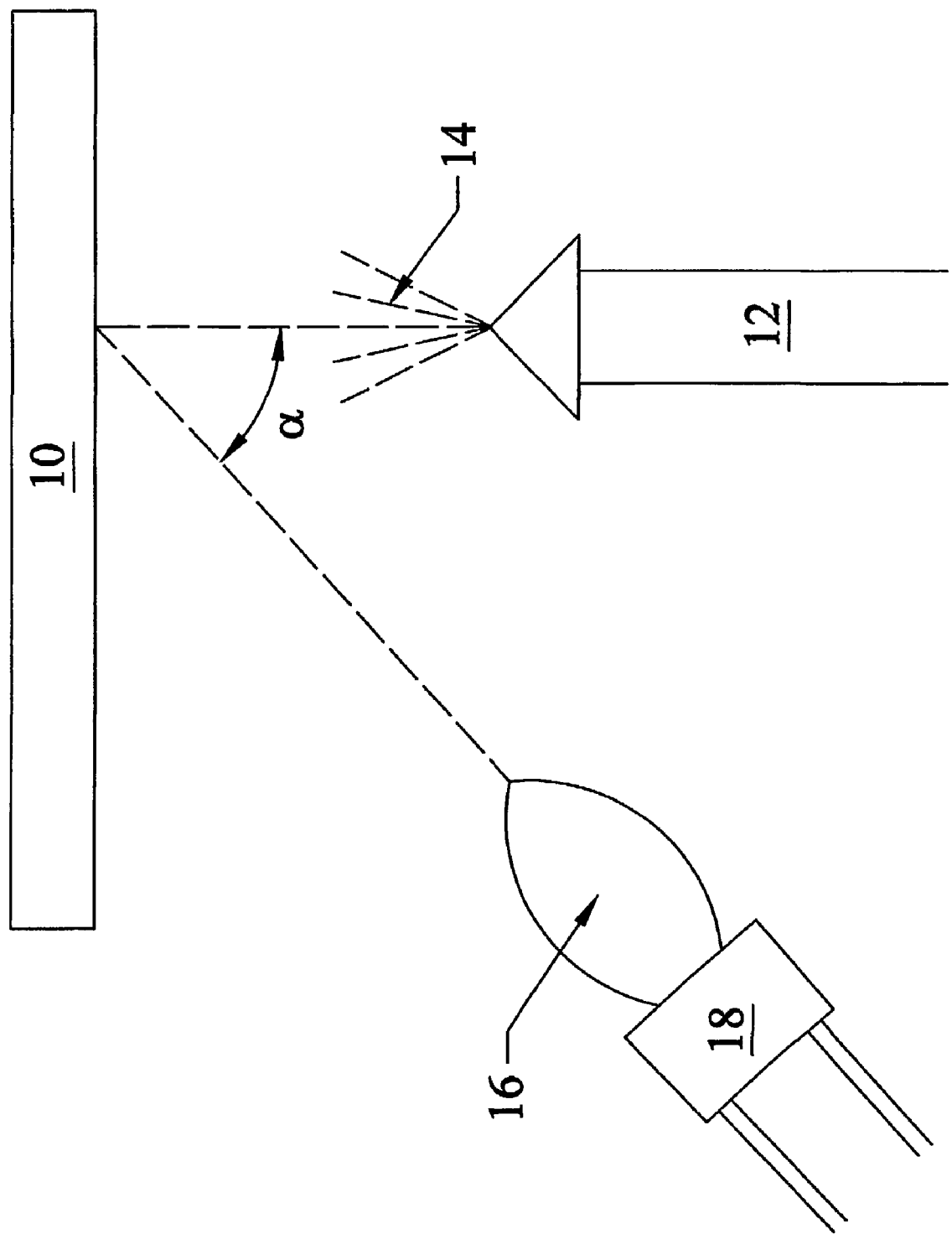

METHOD OF DEPOSITING MATERIALS

The present invention is directed to deposition of coherent materials, such as bodies, films or coatings, most particularly films or coatings. Oxide coatings formed in accordance with the invention may be used as protective coatings, thermal barriers or electrical insulation. Similar uses may be found for polymer coatings deposited in accordance with the present invention. Metal coatings formed in accordance with the invention may be used for electrical conduction, and certain metals may be applied over corrosion-sensitive substrates to provide corrosion resistance.

BACKGROUND OF THE INVENTION

U.S. Pat. No. 5,652,021 describes a flame-based deposition technique termed combustion chemical vapor deposition or "CCVD". U.S. Pat. No. 5,997,956 describes a CCVD process using near-supercritical fluid solutions. The teachings of each of the above-mentioned U.S. Patents are incorporated herein by reference. The techniques taught in these patents allow for large-scale, open-atmosphere deposition of films or coatings of a variety of materials, including metals, polymers, metal oxides, metalloid oxides, and mixed oxides, as thin layers on various substrates and also provide for production of powders of fine, generally uniform size. In these processes, atomization of chemical precursor solutions may be effected by passing the precursor solutions under pressure through narrow diameter needles or nozzles.

While CCVD is an effective means of depositing very thin films, and while thicker films may be deposited by increasing deposition times and/or increasing the number of passes of a CCVD flame over a substrate, there may be practical constraints that limit the usefulness of depositing thicker films or coatings, e.g., 10 microns or greater, by conventional CCVD. Accordingly, it is a primary object of the present invention to produce relatively thick coatings, e.g., 10 microns thick or above, preferably 20 microns thick or above. However, the invention is not limited to these thicknesses, and the invention is generally useful for depositing coherent materials, such as films or coatings, as thin as about 0.1 micron and up to about 1000 microns or above.

SUMMARY OF THE INVENTION

In accordance with the present invention, coherent materials, such as bodies, films, or coatings, are produced by depositing on a substrate a precursor suspension of finely divided particulates in a carrier fluid. Generally contemporaneous with depositing the precursor suspension from a first source, hot gases, such as hot gases produced from a flame by burning a flammable fluid, is applied to the deposited precursor suspension from a remote second source to evaporate carrier liquid, such as water or organic solvent if the carrier fluid is a liquid, and to fuse the particulates and thereby form the coherent material The hot gases may carry precursor chemicals or may be derived from a CCVD flame in which precursor chemicals are dissolved in a flammable fluid and reacted by the flame-produced hot gases so as to co-deposit along with the particulates to form a portion of the coherent material. Likewise, the precursor suspension may contain dissolved material that co-deposits with the particulates to form a portion of the coherent material and/or a precursor of a material that co-deposits with the particulates to form a portion of the coherent material. Co-deposited material may be used to effect the properties of the coherent material. For example, co-deposited material may include cure catalysts and/or cross-linking agents for polymers.

BRIEF DESCRIPTION OF THE DRAWINGS

The FIGURE is a diagrammatic illustration of deposition of a spray of precursor suspension onto a substrate and simultaneous application of a hot gas-producing flame to the deposited suspension to fuse the particulates and thereby form a coherent material on the substrate.

DETAILED DESCRIPTION OF CERTAIN PREFERRED EMBODIMENTS

Illustrated in the FIGURE is apparatus for depositing a coherent material, such as a coating, on the surface of a substrate 10. A precursor suspension of particulates in a carrier fluid is atomized by a nozzle 12 to produce a spray 14 of the suspension that is directed at the substrate. Simultaneous with deposition of the sprayed precursor suspension on the substrate 10, a flame 16 is directed from remote second nozzle 18 at the substrate 10 so as to evaporate carrier liquid from the deposited precursor fluid and fuse or fuse and cure the precursor material to thereby form the cohesive material, e.g., the coating.

While a flame is the preferred source of hot gases, other methods of producing a heated gas flow can be used in place of the flame 16. Nozzle 18 could be a heated metal body from which hot gases flow or nozzle 18 could be a plasma source. The gas temperature when interacting with the spray should be below 2000° C. and preferably below 1000° C. Excessive temperature can result in damage to the substrate or medium and/or to the material that is being deposited. The key aspect of the flame or heat source 16 and the nozzle 18 is that sufficient energy results in a gas flow that upon entraining into the suspension spray and flow over the substrate surface provides sufficient bonding, e.g., binding or sintering, occurs to produce a coherent film or coating or to form a body.

The nozzle 18 may be a CCVD nozzle, such as those described in the above-referenced U.S. Pat. Nos. 5,652,021 and 5,997,956, that produces a flame from a flammable fluid that contains at least one precursor chemical for forming a material that co-deposits on the substrate 10 along with the suspension spray 14 from nozzle 12. If the flame 16 is a CCVD flame that co-deposits material, the flame is directed at the substrate 10 simultaneously with deposition of the suspension spray 14 from nozzle 12 such that the material deposited by the CCVD flame is deposited along with the suspension spray 14.

If the flame 16 is used merely to fuse or fuse and cure, it can be applied simultaneously to the substrate along with suspension spray 14 application, or it can be applied to the area of suspension spray application just subsequent to application of suspension spray 14. In depositions of this type, to provide uniform coating over the substrate surface, there is typically provided means (not shown) for moving (rastering) the substrate 10 relative to the precursor fluid nozzle 12 and flammable fluid nozzle 18. In the FIGURE, the suspension nozzle 12 is directed at the substrate 10 at an angle α of approximately 45°; however, this may vary depending upon particular deposition requirements. For example, if the suspension spray 14 and flame 16 need not be applied exactly simultaneously, both the suspension spray and flame could be pointed directly at the substrate 10. Variations of the illustrated apparatus may be envisioned.

For example, two or more flame nozzles may be disposed in an array around a suspension spray nozzle, particularly when the substrate is rastered relative to the deposition nozzles.

Another embodiment is that the precursor particulates are in a dry powder form suspended in a gaseous fluid and are fed through a directing device 12, such as an air nozzle or an electrostatic sprayer, yielding a particulate/gas stream 14. This aspect obviates any evaporation step. Further, if also using a CCVD flame, this allows the CCVD-produced materials to interact with the particulates sooner. It is to be noted that the bulk of the material being deposited is not sent through the main energizing environment as is the case with CCVD and thermal spray. These relatively small particulates would be excessively changed in morphology or chemistry if exposed to high temperatures.

One type of atomizer nozzle is the nozzle of a venturi effect sprayer, such as that sold by Kool Mist® sprayer. Precursor fluids can also be atomized, as is done in conventional CCVD atomization, by forcing the precursor fluid under pressure through a constricted nozzle or needle. Such is described, for example, in above-referenced U.S. Pat. No. 5,997,956.

An important utility of the present invention is to produce oxide films formed, at least in part, from oxide particulates, such as silica particulates. An oxide particulate suspension comprises an aqueous medium in which is suspended between about 0.1 and about 10 wt % oxide particulates, preferably between about 0.5 and about 5 wt % oxide particulates. The suspension must not be too concentrated or it may be too viscous to flow easily through supply lines or in the atomizer. It should not be too dilute, or deposition times will be excessive and energy use to evaporate carrier liquid will be excessive. Generally, it is preferred to use as concentrated a suspension as is consistent with ease of application, including ease of atomization.

In general, any inorganic particulates may be deposited. Suitable oxide particulates for use in the invention include, but are not limited to silica, alumina, alumina silicates, ceria, yttria, magnesia, titania, glasses, and mixtures thereof. Metals that may be deposited include, but are not limited to, platinum, gold, silver, nickel, copper, chromium and mixtures thereof. Metals, metalloids, nitrides, carbides, borides, phosphates, carbonates, borates, mixtures thereof, etc., may be deposited as particulates, either as liquid suspensions or as gas-entrained dry powders.

Generally the particulate suspension, e.g., of oxide particulates, is aqueous, but it is contemplated that the suspension may comprise organic components, including solvents, suspension promoters, surfactants, etc., that are consistent with the requirements of film formation and consistent with the desired end properties of the coating. Typically, such organic components comprise up to about 30 wt % of the suspension. To this end, it is preferred that any organic component(s) either evaporate or burn away leaving no deposit upon application of the hot gases or else leave a residue that is at least consistent with the desired use of the coating or which may possibly impart beneficial characteristics to the coating. As an example of imparting desired properties, an alkali metal-containing surfactant, such as sodium laurate, may be used to promote suspension of particulates if the alkali metal oxide that will be co-deposited with the particulates is desired for altering the microstructure or electrical, e.g., dielectric, characteristics of a deposited film. Organic components may also act as binding agents for the particulates.

The particulates, e.g., oxide particulates, themselves may range in average particulate size (as measured along the greatest dimension of the particulate) of between about 0.001 micron to about 10 microns, preferably between about 0.01 to about 2 microns. The size of the initial particulates may be expected to affect properties of the coating that is formed, although this aspect has not been fully explored. The particulates need not be identical in chemical composition, and a mixture of two or more types of particulates may be suspended. However, the two types of particulates must be capable of being joined into a coherent material by co-sintering, by co-deposition using a CCVD flame, or by binding agents that are contained in or produced from either the particulate suspension or the hot gas stream.

Certain commercial formulations are useful for use as the oxide particulate-containing deposition. For example, Beuhler® silica contains between about 30 and about 60 wt % silica particulates of average particulate size of 0.06 microns. Such a concentrated solution is typically diluted to facilitate atomization.

The particulate suspension, in addition to the particulates, may contain additional components that may be incorporated into the film or which may, upon treatment, e.g. combustion or exposure to hot gases, produce materials that are incorporated, along with the particulates, into the coherent material that forms.

The flammable fluid that burns to form the hot gas-producing flame is an organic fuel or mixture of organic fuels that may or may not contain precursors, e.g., dissolved or suspended precursors, for materials that are to be co-deposited with the particulates. The flame may be simply formed from a gaseous (at standard temperature and pressure) hydrocarbon, such as propane or butane, or from a liquid hydrocarbon, such as toluene. For many applications in which the flame co-deposits a desired material, the fuel is a mixture of hydrocarbons, such as a mixture of propane and toluene.

Hot gas temperature must be sufficient to bind or sinter the particulates from the precursor suspension. For sintering silica particulates, gas temperatures entrained into the particulate-containing spray are typically 800 to 1000° C. Flame or entrained gas temperatures will vary, depending upon the particulate material and/or organic material to be sintered or bound.

When depositing a suspension of particulates, a CCVD deposition of a material(s), that is the same or different from the particulates, may be used. For example, when the particulate material is silica, a CCVD solution containing a silica precursor, such as tetraethoxysilane (TEOS) or tetramethylsilane (TMS), may be used to co-deposit flame-produced silica that helps bind the particulates together. Other materials, particularly yttria and sodium, may serve as adhesion promoters between particulates. Yttria may be deposited by the CCVD flame or may be formed when the CCVD flame burns an yttrium-containing precursor chemical co-deposited with the particulates from the suspension. Oxides which are conveniently deposited by CCVD flame include, but are not limited to, silica, yttria, ceria, chromia, alumina, alumina silicates, glasses, and mixtures of such oxides. A wide variety of precursors may be added to the solution that forms the CCVD flame which impart a variety of properties to the film. Precursors for depositing materials containing a variety of chemical elements include, but are not limited to:

Ag silver nitrate, silver trifluoroacetate, silver acetate, silver cyclohexanebutyrate, silver 2-ethylhexanoate Al aluminum nitrate nonahydrate, aluminum acetylacetonate, triethylaluminum, aluminum sec-butoxide, aluminum iso-propoxide, aluminum bis(2-ethylhexanoate) monohydroxide Au chlorotriethylphosphine gold (I), chlorotriphenylphosphine gold (I)

B trimethylborate, trimethoxyboroxine

Ba barium 2-ethylhexanoate, barium nitrate, barium acetylacetonate hydrate, bis(2,2,6,6-tetramethyl-3,5-heptanedionato) barium hydrate Bi bismuth (III) nitrate pentahydrate, bismuth (III) 2-ethylhexonate Cd cadmium nitrate tetrahydrate, cadmium 2-ethylhexanoate Ce cerium (III) 2-ethylhexanoate Cr chromium (III) nitrate nonahydrate, chromium (III) 2-ethylhexanoate, chromium (III) sulfate hydrate, chromium hexacarbonyl, chromium (III) acetylacetonate Cu copper (II) 2-ethylhexanoate, copper (II) nitrate trihydrate, copper (II) acetylacetonate hydrate Co cobalt naphthenate, dicobalt octacarbonyl, cobalt (II) nitrate hexahydrate Fe iron (III) nitrate nonahydrate, iron (III) acetylacetonate In indium (III) nitrate hydrate, indium (III) acetylacetonate Ir dihydrogen hexachloroiridate (IV) hydrate, iridium (III) acetylacetonate, dodecacarbonyltetrairidium K potassium ethoxide, potassium tert-butoxide, 2,2,6,6-tetramethylheptane-3,5-dionato potassium La lanthanum (III) 2-ethylhexanoate, lanthanum (III) nitrate hexahydrate, lanthanum (III) acetylacetonate hydrate, lanthanum (III) iso-propoxide, tris(2,2,6,6-tetramethyl-3,5-heptanedionato)lanthanum (III)

Li 2,2,6,6-tetramethylheptane-3,5-dionato lithium, lithium ethoxide lithium tert-butoxide Mg magnesium naphthenate, magnesium 2-ethylhexanoate, bis(2,2,6,6-tetramethyl-3,5-heptanedionato)magnesium dihydrate, magnesium acetylacetonate, magnesium nitrate hexahydrate Mo ammonium molybdate tetrahydrate, molybdenum hexacarbonyl, molybdenum (IV) dioxide bis(acetylacetonate)

Na 2,2,6,6-tetramethylheptane-3,5-dionato sodium, sodium ethoxide, sodium tert-butoxide Nb niobium (V) ethoxide, tetrakis(2,2,6,6-tetramethyl-3,5-heptanedionato) niobium (VI), niobium (IV) (2-ethylhexanoate)

Ni nickel (II) nitrate hexahydrate, nickel (II) acetylacetonate, nickel (II) 2-ethylhexanoate, nickel (II) napthenate, nickel carbonyl P triethylphosphate, triethylphosphite, triphenylphosphite Pb lead (II) 2-ethylhexanoate, lead naphthenate, bis(2,2,6,6-tetramethyl-3,5-heptanedionato)lead (II), lead (II) nitrate Pd diamminepalladium (II) nitrite, palladium (II) acetylacetonate, ammonium hexochloropalladate (IV)

Pt platinum (II) acetylacetonate, platinum (II) hexafluoroacetylacetonate, diphenyl(1,5-cyclooctadiene)platinum (II), diammineplatinum (II) nitrite, tetraammineplatinum (II) nitrate Ru ruthenium (III) acetylacetonate Si tetraethoxysilane, tetramethylsilane, disilicic acid, metasilicic acid Sn tin (II) chloride dihydrate, tin (II) 2-ethylhexanoate, tetra-n-butyltin, tetramethyltin Sr strontium nitrate, strontium 2-ethylhexanoate, bis(2,2,6,6-tetramethyl-3,5-heptanedionato) strontium hydrate Ti titanium (IV) iso-propoxide, titanium (IV) acetylacetonate, titanium (di-isopropoxide)bis(acetylacetonate), titanium (IV) n-butoxide, titanium (IV) 2-ethylhexoxide, titanium (IV) oxide bis(acetylacetonate)

W tungsten hexacarbonyl, tungsten (VI) fluoride, tungstic acid

Y yttrium (III) 2-ethylhexanoate, yttrium (III) nitrate hexahydrate, yttrium (III) iso-propoxide, yttrium (III) napthoate Yb ytterbium (III) nitrate pentahydrate Zn zinc 2-ethylhexanoate, zinc nitrate hexahydrate, zinc acetate Zr zirconium (IV) 2-ethylhexanoate, zirconium (IV) n-butoxide, zirconium (IV) hexafluoroacetylacetonate, zirconium (IV) acetylacetonate, zirconium (IV) n-propoxide, zirconium dinitrate oxide In coherent material produced in accordance with the invention, about 1 wt % to 100% of the coherent material will derive from particulates, and 0 to about 99 wt % from non-particulate chemicals in the precursor fluid and/or a flammable fluid. Preferably about 50 wt % to about 99 wt % of the material will derive from particulates, and between about 1 wt % to about 50 wt % of the material is derived from non-particulate chemicals in the precursor fluid and/or a flammable fluid.

While an important use of the method of the present invention is in depositing oxide-based materials, other materials can also be produced from deposition of a particulate suspension spray on a substrate along with generally contemporaneous application of a flame or hot gases to the deposited suspension spray.

As the suspension, finely divided metal particulates may be suspended in water or an aqueous solution. A flame is generally contemporaneously applied to the deposited suspension to evaporate water and fuse the metal particulates. Gas temperature depends upon the binding or sintering temperature of the metal or of any incorporated binding components. If oxide-free metals are desired, the process of the present invention is most useful for depositing metals with low oxygen susceptibility, such as gold, silver, platinum, and mixtures thereof, although other oxide-free metals may be deposited if a reducing flame is used. Useful particulate size is similar to particulate size mentioned above with respect to oxide particulates, with the understanding that metals are often more dense than oxides requiring smaller particulate sizes for the particulates to be maintained as stable suspensions. Likewise, concentrations of suspended metal particulates are similar to oxide particulate concentrations mentioned above.

The suspending fluid of the particulate suspension may be a gas in which particulates are suspended and carried to the substrate.

Again with metals, the flame may be used only for the purpose of providing energy to evaporate the carrier fluid and evaporating the solvent. Or the flame may contain precursor chemicals for co-depositing with the metal particulates. For example, when finely divided platinum particulates are deposited in the precursor flame, the solution that is burned to form the flame may contain a platinum precursor, such as platinum acetylacetonate, that co-deposits platinum and helps to fuse the platinum particulates together. Or when depositing a suspension of platinum particulates, the CCVD flame may contain an oxide precursor, such as a silica precursor. The co-deposited oxide increases the electrical resistivity of the fused platinum coating that forms, making the material suitable for forming thin film, embedded resistors. Co-deposition of polymeric materials and clay (alumina silicates) may produce a gas-barrier coating.

Polymeric coatings may be similarly formed from a suspension that comprises suspended polymeric material along with generally contemporaneous application of a flame to the deposited precursor suspension. To be suitable for application by this method, the polymer must be fusible by hot gases, e.g., flame-produced hot gases, applied at a certain temperature range without the hot gases degrading the polymer. Some particularly useful flame-resistant polymers that may be applied as particulate suspensions by the method of the present invention include polyimide, polyamide/imide and polytetrafluoroethylene. Polyimide and/or polyamide/imide may be formed from dissolved or suspended polyamic acids. Particulate size and concentrations of polymer particulates may be similar to those discussed above with respect to oxide particulates and metal particulates, although because polymers are typically less dense than either oxides or metals, suspension of larger polymer particulates may form stable suspensions and thus be useful in the process of the invention.

If a polymer is water-soluble, the polymer may be dissolved in an aqueous precursor suspension of particulates of similar or different materials. Likewise, solvent-soluble polymers may be dissolved in an organic precursor suspension of particulates of similar or different materials. The concentration of dissolved polymers used may depend upon the viscosity of the solution, which must be consistent with ease of spray application.

Suspended polymer particulates may be a thermoplastic, in which case the hot gases are applied to the deposited spray to evaporate carrier liquid and fuse the thermoplastic polymer. If the suspended polymer is a thermosetting composition, the flame may both fuse and cure the polymer. In the case of a thermosetting polymer, either the carrier fluid of the suspension and/or a flammable fluid that produces a hot gas-producing flame may provide a cross-linking agent and/or a cure catalyst for the thermosetting polymer.

The carrier fluid used to form the precursor suspension in accordance with the present invention is generally water or an aqueous solution. The carrier fluid may be an organic solvent. However, in view of the fact that a flame is applied, careful selection of any such solvent must be made to ensure that its vapor pressure and combustion temperature are consistent with safety.

The method of the invention is suitable for deposition on a wide variety of substrates, including but not limited to metals, ceramics (including glass), polymeric materials, material composites, etc. In addition to utilitarian applications of the invention stated above, decorative coatings may be applied as well. The formed material may be homogenous or may vary in composition, material, size, porosity, permeability, and thus yield gradient and/or layered structures vertically and/or laterally.

The present invention may also be used to form a body of materials that may or may not contain the original substrate or medium on which the material formed. The sprays may be directed, channeled, or masked, such that a desired shape or pattern is formed. The substrate may have a low adhesion to the formed coherent material, or the substrate may be removed by chemical processing. The formed material may also be an enlarged particulate formed in the gas stream and collected via powder and particulate gathering methods. The formed material may be a continuous or a patterned film.

The invention will now be described in greater detail by way of specific Examples.

EXAMPLE 1

An aqueous suspension of extremely small particulate size silica (0.06 μm Beuhler® $SiO_2$ polishing compound) was diluted to a 2.5% weight solution in de-ionized water and sprayed onto the substrate in advance of a CCVD flame carrying silica produced from TEOS (2.1% Si in isopropyl alcohol as precursor). The Beuhler suspension was atomized through a Kool Mist®, sprayer that operates by venturi effect. Kool Mist® sprayer is commonly used in machine tools for misting machined parts with cooling oil. The HPLC pump rate to the CCVD flame was 4.00 ml/min at a Variac® setting of 2.50 amperes, and tip $O_2$ flow rate of 3.8 L/min.

The CCVD flame head was positioned precisely five inches laterally from the suspension spray head, equidistant to the substrate, and at a 45° angle normal to the substrate surface (FIG. 1). This geometry placed the sample surface just beyond the end of the visible portion of the flame, resulting in a gas temperature at the substrate surface of ~800-900° C., although this was difficult to measure accurately.

In the present case, the substrate was stationary while the Kool Mist® Sprayer and the atomizer moved to produce the silica coating. A motion program was employed to coat the substrate at 25 inches per minute. A total of sixty passes were conducted to produce the coating in 50 minutes. As a means of preheating the substrate, a TEOS flame was applied for 5 minutes. It is ideal, due to the nature of the Al—SiC composite that the flame does not dwell on the substrate. To ensure of proper curing of the precursor upon substrate, the final fifteen minutes of deposition was purely the CCVD TEOS flame.

EXAMPLE 2

The following solutions were prepared:
Yttrium stock solution: 0.7 wt % yttrium as yttrium 2-ethylhexanoate (Yt-EH) in toluene.
Solution A: 5 ml Beuhler® silica suspension mixed with 135 ml. $H_2O$.
Solution B: 0.3 g Yttrium stock solution mixed with 25 ml. $H_2O$.
Deposition solution: 1:1 mixture of Solutions A and B by volume.
The flame in this example was produced from 100% propane.

Films were deposited generally under the conditions of Example 1. The Yt-EH is oxidized by the flame to produce yttria which acts as an adhesion promoter in the deposited film.

EXAMPLE 3

A flammable solution for depositing ceria from a CCVD flame is formed from a stock solution that is 1.8% by weight of cerium of cerium 2-ethylhexanoate in toluene. The stock solution is then dissolved in 48 ml toluene and 204 g. propane.

Several advantages of the invention over other deposition methods should be appreciated. An advantage of this co-deposition process versus thermal spray is the materials here are not subjected directly to the high heat zone of a plasma which would cause many materials, especially small grain materials, to be evaporated. The co-deposition process allows such materials to stay as small particulates and have the different materials then maintain more of a size close to their original size. Also, a number of materials subjected to a plasma spray environment are decomposed or altered excessively. The present invention enables materials such as polymers, very fine grains, silicas, etc. to be deposited without excessively altering the properties or decomposing the materials. The materials are able to be broken up and sprayed at a surface prior to being subjected to the heat. The heat is more focused at the surface and not at the spray itself but usually in the area of where the spray intercepts the surface so the particles are only heated slightly prior to meeting the surface. If the heat source, i.e., heated gases, were too distal from the spray impact area, if a liquid spray were used, then the materials might drip and run. By having the hot gases present right at the surface of the spray, the liquid is able to be evaporated. If a powder is being deposited, the powder is able to sinter and form onto the surface rather than being blown off the surface. So it is enabled for the powder to be a little sticky if it were a dry powder feed versus the wet.

These aspects significantly differentiate the present invention from thermal spray or processes where a substrate is sprayed and then heated afterwards to cause the coating to densify with the advantages of no dripping occuring and more material sticking to the surface.

The co-deposition process is also significantly different from spray pyrolysis where the substrate is heated to a higher point wherein many substrates cannot handle the correct heat amount required to cause the coating to become coherent. It is difficult to heat a subject, in particular a coating, in certain areas of a larger substrate.

The particles that are co-deposited can be man-made or ground powders or of natural materials of natural size. Potentially materials from nature include clays, brown cords (?), micas and other materials that can be aligned in certain structures for increased strength or gas diffusion barrier type properties. Plate-like materials when deposited by the present invention can form a preferred orientation, e.g., laying down with the plate surfaces normal to the flame aligning with the surface of the substrate. Clays in general are luminous oriented.

What is claimed:

1. A method of forming a coherent material on a substrate comprising: providing a precursor suspension of particulates in a carrier fluid, from a first source, directing said precursor suspension at a surface of said substrate to deposit said precursor suspension on said substrate surface, and generally contemporaneously with depositing said precursor suspension on said substrate surface, from a second source that is displaced relative to said first source, directing hot gases at said deposited precursor suspension to fuse said particulates into the coherent material said hot gases providing at least one of a metal, a metal oxide, or a metalloid oxide that co-deposits with said particulates and incorporates into said coherent material.

2. The method according to claim 1 wherein said particulates comprise oxide particulates and said hot gases provide at least one of a metal oxide or a metalloid oxide.

3. The method according to claim 1 wherein said particulates comprise metal particulates and said hot gases provide at least one of a metal oxide or a metalloid oxide.

4. The method according to claim 1 wherein said particulates comprise metal particulatos and said hot gases provide a metal.

5. The method according to claim 1 wherein between about 50 wt % and about 99 wt % of said coherent material is derived from said particula tea of said suspension, and between about 1 and about 50 wt % comprises said co-deposited metal, metal oxide or metalloid oxide.

6. The method according to claim 1 wherein said particulates comprise particuiates of materials selected from the group consisting of silica, alumina, alumina silicates, ceria, yttria, magnesia, titania, glasses, and mixtures thereof.

7. The method according to claim 1 wherein said method is used to produce a coherent material between about 10 and about 1000 microns in thickness.

8. The method according to claim 1 wherein said method is used to produce a coherent material layer at least about 1 micron in thickness.

9. The method according to claim 1 wherein said method is used to produce a coherent material at least about 10 microns in thickness.

10. The method according to claim 1 wherein said method is used to produce a coherent material at least about 20 microns in thickness.

11. The method according to claim 1 wherein said particulates comprise a metal selected from the group consisting of gold, silver, platinum, nickel, copper, chromium, and mixtures thereof.

12. The method according to claim 1 wherein said carrier liquid comprises water.

13. The method according to claim 1 wherein said particulates comprise a polymeric material.

14. The method according to claim 1 wherein said precursor suspension further comprises polymeric material dissolved in said carrier liquid.

15. The method according to claim 1 wherein said precursor suspension further comprises a material selected from the group consisting of polyiniidc, polynmidelimidc and polyamie acid.

16. The method according to claim 1 wherein said precursor suspension comprises a thermosetting polymer and said precursor fluid and/or said hot gases comprises a chemical selected from the group consisting of a cross-linking agent for said thermosetting polymer, a cure catalyst for said thermosetting polymer, and a mixture thereof.

17. The method according to claim 1 wherein the average particle size of particulates in said suspension range from 0.001 to 10 microns.

18. The method according to claim 1 wherein the overage particle size of particulates in said suspension range from 0.01 to 2 microns.

19. A method of forming a coherent material on a substrate comprising:

providing a first precursor fluid that is a suspension of particulates in a carder liquid, from a first source, directing said first precursor fluid at a surface of said substrate to deposit said first precursor fluid on said substrate surface, providing a second precursor fluid comprising a flammable liquid, generally contemporaneously with depositing said precursor suspension on said substrate surface, from a second source that is displaced relative to said first source, directing said second precursor. fluid at said deposited first precursor solution and combusting said second precursor fluid to produce hot gases that fuse said particulates into the coherent material.

20. The method according to claim 19 wherein said second precursor fluid comprises a dissolved metal-containing or a metalloid-containing chemical that deposits either as said chemical or a combustion product of said chemical along with said particutates to form a portion of said coherent material.

21. The method according to claim 19 wherein said particulates comprise particulates of materials selected from the group consisting of silica, alumina, alumina silicates, curia, yttria, magnesia, titania, glasses, and mixtures thereof.

22. The method according to claim 19 wherein said method is used to produce a coherent material between about 10 and about 1000 microns in thickness.

23. The method according to claim 19 wherein said particulates comprise a metal selected from the group consisting of gold, silver, platinum, nickel, copper, chromium, and mixtures thereof.

24. The method according to claim 19 wherein said carrier liquid comprises water.

25. The method according to claim 19 wherein said particulates comprise a polymeric material.

26. The method according to claim 19 wherein said precursor suspension further comprises. polymeric material dissolved in said carrier liquid.

27. The method according to claim 19 wherein said precursor suspension comprises a thermosetting polymer and said precursor fluid and/or said hot gases comprises a chemical selceted from the group consisting of a cross-linking agent for said thermosetting polymer, a cure catalyst for said thcnnosemting polymer, and a mixture thereof.

28. The method according to claim 19 wherein the average particle size of piuliculates in said suspension range from 0.001 to 10 microns.

* * * * *